United States Patent Office 3,492,300
Patented Jan. 27, 1970

3,492,300
BENZO[5,6]-[1,2,3]TRIAZINO(3,4-b)INDAZOLES AND SYNTHESIS THEREOF
Stanley C. Bell, Narberth, and Scott J. Childress, Philadelphia, Pa., assignors to American Home Products Corporation, New York, N.Y., a corporation of Delaware
No Drawing. Continuation-in-part of application Ser. No. 614,810, Feb. 9, 1967. This application Apr. 5, 1968, Ser. No. 719,236
Int. Cl. C07d 57/34
U.S. Cl. 260—248    10 Claims

ABSTRACT OF THE DISCLOSURE

By reacting 3-phenylindazoles with nitrites, there are formed benzo[5,6][1,2,3]triazino(3,4-b)indazoles which are useful as anti-amebic agents.

---

This is a continuation-in-part application of U.S. patent application, Ser. No. 614,810, filed on Feb. 9, 1967, now abandoned, and also entitled "Synthesis of Benzo-[5,6][1,2,3]Triazino(3,4-b)Indazolines."

This invention relates to new and novel benzotriazinoindazoles as well as to a method for their preparation. In particular, this invention is concerned with benzo[5,6][1,2,3]triazino(3,4-b)indazoles which in standard and accepted tests have demonstrated utility as anti-amebic agents.

The compounds which are included within the scope of this invention are depicted by the following formula:

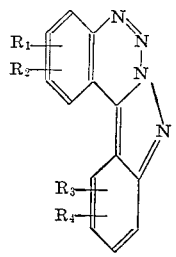

wherein $R_1$ and $R_2$ are selected from the group consisting of hydrogen, halogen, lower alkyl, and lower alkoxyl; and $R_3$ and $R_4$ are selected from the group consisting of hydrogen, sulfamoyl, halogen, lower alkyl and lower alkoxy with the proviso that when $R_3$ is sulfamoyl $R_4$ is selected from the group consisting of hydrogen, halogen, lower alkyl and lower alkoxy. Typical examples thereof are: 2 - chlorobenzo[5,6][1,2,3]triazino(3,4 - b)indazole-11-sulfonamide; 3-bromobenzo[5,6][1,2,3]triazino(3,4-b)indazole-11-sulfonamide and 10-bromo-2-methoxybenzo[5,6][1,2,3]triazino(3,4-b)indazole.

The new and novel process of this invention is illustrated by the following reaction scheme:

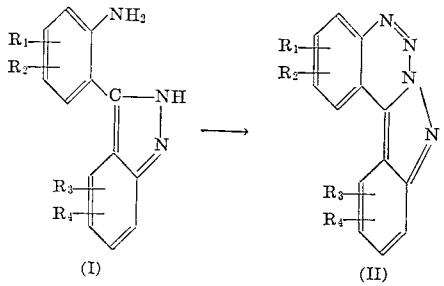

wherein $R_1$, $R_2$, $R_3$ and $R_4$ are defined as above. The reaction is effected by admixing a nitrite with a solution of a 3-phenylindazole (I) in a reaction-inert, water miscible solvent acidified with a mineral acid. Preferably this reaction is conducted with sodium nitrite in dimethylformamide acidified with hydrochloric acid.

When the action is complete, the precipitated product (II) is separated by conventional methods, such as, filtration, and then recrystallized from a suitable solvent e.g. an alkanol, dimethylsulfoxide and dioxan to afford an appropriate benzotriazinoindazole (II).

The 3-phenylindazoles (I) used as starting materials to synthesize the compounds of the present invention are prepared by the procedure described in copending U.S. patent application, Ser. No. 610,471, entitled "Indazole-5-Sulfonamides," filed on Jan. 20, 1967 by Stanley C. Bell and Carl Gochman. The nitrites used in the process of the present invention are known compounds which may be readily obtained from commercial sources. By the term "reaction-inert, water miscible solvent" is meant any solvent which will easily admix with water and dissolve the reactants without interfering with their interaction. Typical examples of such solvents are: water, an alkanol, dioxan and dimethoxy ethane. By "mineral acid" as employed herein is meant any inorganic acid, such as, hydrochloric, hyrobromic, and sulfuric acid. Many such "mineral acids" and "reaction-inert, water miscible solvents" will readily suggest themselves to one skilled in the art of chemistry. The word "nitrite" as employed herein refers to both inorganic and organic nitrite compounds e.g. sodium nitrite, potassium nitrite, ethyl nitrite, propyl nitrite and butyl nitrite etc.

In accord with the present invention, the benzotriazinoindazoles (II) of this invention have been found to possess valuable anti-amebic properties. In particular, in standard in vitro screening procedures these compounds have demonstrated anti-amebic activity, especially against *Endameba histolytica* and are useful as anti-amebic agents.

In the amebicidal evaluation of the compounds of this invention the test substance is incorporated and diluted in the aqueous phase of Boeck-Drbohlav diphasic medium fortified with rice starch. The medium is inoculated with polybacteria and a known number of trophozoites of *E. histolytica* NIH 200. After forty-eight hours incubation at 35° C., the trophozoites are counted. The procedure is derived from Thompson, et al, Antibio. and Chemo., 6, 337–50 (1956). The endpoint is expressed as the percent of *E. histolytica* killed at a particular concentration (μg./ml.) of test compound. In this test the benzo[5,6][1,2,3]triazino(3,4-b)indazoles of this invention average about a sixty-five percent kill of *E. histolytica* at a concentration of 500 μg./ml. and about a ninety percent kill of *E. histolytica* at 1000 μg./ml.

The anti-amebic activity of the compounds (III) of this invention can be utilized for washing equipment in hospitals and homes, instruments used in medicine and bacteriology, clothing used in bacteriological laboratories, and floors, walls and ceiling in rooms in which a background free of *E. histolytica* is desired.

The benzotriazinoindazoles (II) of the present invention are useful in a number of compositions comprising the active compound and an inert material. In such compositions, while the active compounds (II) of this invention may be employed in concentrations as low as 500 p.p.m., from a practical point of view, it is desirable to use from about 0.10% by weight, to about 5% by weight or more. In particular, useful compositions for use as washing solutions, the active compounds of this invention may be used generally in the range of from 0.050% to 0.25% by weight.

The benzo[5,6][1,2,3]triazino(3,4-b)indazoles of the present invention can readily be formulated by those skilled in the art into a wide variety of amebicidal compositions. The examples hereinafter will provide details for doing so in representative instances. However, in general, standard techniques can be employed. For example, the active compounds per se can be made up in stock solutions. They can also be formulated as suspensions in an aqueous vehicle. These make useful mixtures to decontaminate premises. Also, aqueous vehicles containing emulsifying agents, such as sodium lauryl sulfate, and relatively high concentrations, e.g., up to about 5% by weight, of a benzotriazinoindazole (II) can be formulated by conventional techniques.

The following examples are given by way of illustration and are not to be construed as limitations of this invention, many variations of which are possible without departing from the scope and spirit thereof.

EXAMPLE I

To a solution of 1.7 g. of 3-(2-amino-5-chlorophenyl)-5 - sulfamoyl-1H-indazole in 40 ml. of dimethylformamide acidified with dilute hydrochloric acid, there is added an aqueous solution of sodium nitrite. The resulting yellow precipitate is then collected, washed with ethanol, and recrystallized from dimethylformamide-water to afford 2 - chlorobenzo[5,6][1,2,3]triazino(3,4 - b)indazole - 11 - sulfonamide.

*Analysis.*—Calcd. for $C_{13}H_8ClN_5O_2S$: C, 46.78; H, 2.42; N, 20.99; S, 9.61; Cl, 10.62. Found: C, 46.95; H, 2.60; N, 20.89 S, 9.6 Cl, 10.5.

EXAMPLE II

To a solution of 3.5 g. of 3-(2-amino-4-bromophenyl)-5 - sulfamoyl-1H-indazole in 80 ml. of wated acidified with dilute sulfuric acid, there is added an aqueous solution of butyl nitrite. The resulting precipitate is then collected, washed with methanol, and recrystallized from dimethylsulfoxide to afford 3-bromobenzo[6.5][1,2,3]triazino(3,4-b)indazole-11-sulfonamide.

In a similar manner, 3 - (2 - amino-5-methyl)-6-chloro-5-sulfamoyl-1H-indazole is reacted with ethyl nitrite to yield 10 - chloro - 2 - methylbenzo[5,6][1,2,3]triazino(3,4-b)indazole-11-sulfonamide.

EXAMPLE III

To a solution of 7.0 g. of 3 - (2-amino-5-methoxyphenyl) - 6 - bromo - 1H - indazole in 150 ml. of dioxan acidified with dilute hydrobomic acid, there is added an aqueous solution of propyl nitrite. The resulting precipitate is then collected, washed with dioxan, and recrystallized from ethanol to afford 10 - bromo - 2 - methoxybenzo[5,6][1,2,3]triazino(3,4-b)indazole.

Similarly, 3 - (2 - amino - 6 - fluorophenyl) - 1H-indazole is reacted with propyl nitrite to afford 1-fluorobenzo[5,6][1,2,3]triazino(3,4-b)indazole.

EXAMPLE IV

Repeating the procedure of Examples I–III to react an appropriate 3-phenylindazole with a nitrite, the following benzotriazinoindazoles are prepared:

benzo[5,6][1,2,3]triazino(3,4-b)indazole;
2,3 - dichlorobenzo[5,6][1,2,3]triazino(3,4 - b)indazole-11-sulfonamide;
4 - ethoxy - 9 - ethylbenzo[5,6][1,2,3]triazino(3,4-b)indazole;
2,3 - dimethoxybenzo[5,6][1,2,3]triazino(3,4 - b)indazole;
2 - chloro - 3 - ethylbenzo[5,6][1,2,3]triazino(3,4-b)indazole;
10,11 - dibromobenzo[5,6][1,2,3]triazino(3,4 - b)indazole;
2 - propylbenzo[5,6][1,2,3]triazino(3,4-b)indazole-11-sulfonamide; and
10 - bromo - 2,3 - dimethoxybenzo[5,6][1,2,3]triazino-(3,4-b)indazole-11-sulfonamide.

EXAMPLE V

An amebicidally active wash solution is prepared as follows:

| Components: | Parts by wt. |
| --- | --- |
| Potassium tripolyphosphate | 19.5 |
| Sodium tripolyphosphate | 5.0 |
| Alkyl aryl sulfonate anionic detergent | 33.0 |
| Lauric acid alkanolamine condensate | 5.0 |
| Carboxymethylcellulose | 0.5 |
| 2 - chlorobenzo[5,6][1,2,3]triazino(3,4 - b)indazole - 11 - sulfonamide | 1.0 |

The above components are mixed together at 22° C. to form the final product.

EXAMPLE VI

An amebicidally-active industrial cleaning composition is prepared as follows:

| Components: | Parts by wt. |
| --- | --- |
| Neutral soap (K and Na soaps of stearic, palmitic and oleic acid) | 30.0 |
| Bentonite | 30.0 |
| Sodium lauryl sulfate | 10.0 |
| Lanolin | 5.0 |
| 3 - bromobenzo[5,6][1,2,3]triazino(3,4 - b)indazole - 11 - sulfonamide | 1.5 |

The bentonite and sodium lauryl sulfate are mixed together. The soap and lanolin are mixed with the sulfonamide and heated to about 70° C., after which they are mixed with the bentonite and sodium lauryl sulfate. The product may then be pressed into cake form, or 27 parts of corn meal may be mixed with 75 parts of the mixture to form a powdered amebicidally-active soap composition.

EXAMPLE VII

A biocidally-active composition useful to decontaminate premises which have been infected with *E. histolytica* is prepared by dissolving 2-chlorobenzo[5,6][1,2,3]triazino - (3,4 - b)indazole - 11 - sulfonamide in methanol and adding water to provide a concentration of 3.0 g. per liter of formulation. If, during formulation, the addition of water causes the active compound to precipitate, more of the co-solvent (methanol) is added.

What is claimed is:

1. A compound selected from the group consisting of those having the formula:

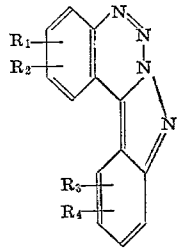

wherein $R_1$ and $R_2$ are selected from the group consisting of hydrogen, halogen, lower alkly, and lower alkoxy; and $R_3$ and $R_4$ are selected from the group consisting of hydrogen, sulfamoyl, halogen, lower alkyl and lower alkoxy with the proviso that when $R_3$ is sulfamoyl $R_4$ is selected from the group consisting of hydrogen, halogen, lower alkyl and lower alkoxy.

2. A compound as described in claim 1 which is: 2-chlorobenzo[5,6][1,2,3]triazino(3,4 - b)indazole - 11 - sulfonamide.

3. A compound as described in claim 1 which is: 3-bromobenzo[5,6][1,2,3]triazino(3,4 - b)indazole - 11 - sulfonamide.

4. A compound as described in claim 1 which is: 10-chloro - 2 - methylbenzo[5,6][1,2,3]triazino(3,4 - b)indazole-11-sulfonamide.

5. A compound as described in claim 1 which is: 10-bromo - 2 - methoxybenzo[5,6][1,2,3]triazino(3,4 - b)indazole.

6. A compound as described in claim 1 which is: benzo[5,6][1,2,3]triazino(3,4-b)indazole.

7. A compound as described in claim 1 which is: 2,3-dichlorobenzo[5,6][1,2,3]triazino,3,4 - b)indazole - 11 - sulfonamide.

8. A process for the preparation of compounds having the formula:

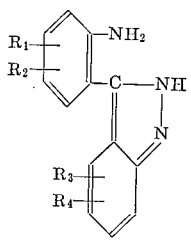

wherein $R_1$ and $R_2$ are selected from the group consisting of hydrogen, halogen, lower alkyl, and lower alkoxy; and $R_3$ and $R_4$ are selected from the group consisting of hydrogen, sulfamoyl, halogen, lower alkyl and lower alkoxy with the proviso that when $R_3$ is sulfamoyl $R_4$ is selected from the group consisting of hydrogen, halogen, lower alkyl and lower alkoxy which comprises reacting a 3-phenylindazole of the formula:

with a nitrite; in a reaction-inert water miscible solvent acidified with a mineral acid.

9. A process as described in claim 8 wherein the nitrite employed is sodium-nitrite; the reaction-inert, water miscible solvent is dimethylformamide; and the mineral acid is hydrochloric acid.

10. A process as described in claim 8 for the preparation of 2 - chlorobenzo[5,6][1,2,3]triazino(3,4 - b)indazole-11-sulfonamide, wherein the nitrite employed is sodium nitrite; the reaction-inert, water miscible solvent is dimethylformamide; and the mineral acid is hydrochloric acid.

References Cited

UNITED STATES PATENTS 2,925,418  2/1960  Druey et al. _____ 260—249.5
3,333,961  8/1967  Fry et al. _____ 260—249.5 XR HENRY R. JILES, Primary Examiner
J. M. FORD, Assistant Examiner U.S. Cl. X.R.
424—249